(12) United States Patent
Hartner et al.

(10) Patent No.: US 9,982,724 B2
(45) Date of Patent: May 29, 2018

(54) FRICTION PLATE

(71) Applicant: Miba Frictec GmbH, Laakirchen (AT)

(72) Inventors: Gerhard Hartner, Bad Wimsbach (AT); Florian Markowsky, Gmunden (AT); Thomas Sturm, Ohlsdorf (AT)

(73) Assignee: Miba Frictec GmbH, Laakirchen (AT)

( * ) Notice: Subject to any disclaimer, the term of this patent is extended or adjusted under 35 U.S.C. 154(b) by 0 days. days.

(21) Appl. No.: 15/464,765

(22) Filed: Mar. 21, 2017

(65) Prior Publication Data
US 2017/0292573 A1  Oct. 12, 2017

(30) Foreign Application Priority Data

Apr. 8, 2016  (AT) .............................. GM50058/2016

(51) Int. Cl.
| | | |
|---|---|---|
| *F16D 13/64* | (2006.01) | |
| *F16D 13/72* | (2006.01) | |
| *F16D 13/74* | (2006.01) | |
| *F16D 69/00* | (2006.01) | |

(52) U.S. Cl.
CPC ........... *F16D 13/648* (2013.01); *F16D 13/72* (2013.01); *F16D 13/74* (2013.01); *F16D 2069/004* (2013.01)

(58) Field of Classification Search
CPC ........ F16D 13/648; F16D 13/72; F16D 13/74; F16D 2069/004; F16D 13/64
See application file for complete search history.

(56) References Cited

U.S. PATENT DOCUMENTS

| | | | | |
|---|---|---|---|---|
| 4,674,616 | A * | 6/1987 | Mannino, Jr. | ........... F16D 13/64 188/264 D |
| 4,721,191 | A | 1/1988 | Dowell | |
| 5,101,953 | A * | 4/1992 | Payvar | ..................... F16D 13/72 188/218 XL |
| 6,776,272 | B2* | 8/2004 | Granderath | ............. F16H 45/02 192/113.36 |
| 7,789,209 | B2 | 9/2010 | Miyazaki et al. | |
| 2001/0023803 | A1* | 9/2001 | Hattori | .................. F16D 25/064 192/3.29 |

(Continued)

FOREIGN PATENT DOCUMENTS

| | | |
|---|---|---|
| DE | 31 46 505 A1 | 8/1982 |
| DE | 195 00 814 A1 | 8/1995 |

(Continued)

*Primary Examiner* — David J Hlavka
(74) *Attorney, Agent, or Firm* — Collard & Roe, P.C.

(57) ABSTRACT

A friction plate for wet-running applications includes an annular main body having a first and a second surface. A friction lining having first oil grooves and second oil grooves is disposed on at least one of the first and the second surfaces. The first oil grooves extend from a radially inner end face of the friction lining in the direction towards a radially outer end face of the friction lining and terminate at a distance short of the radially outer end face, and the second oil grooves are disposed directly adjoining the first oil grooves in the radial direction and have a smaller maximum width in the circumferential direction than the first oil grooves. The first oil grooves are provided with a cross-sectional widening in the region of a radially outer end. The cross-sectional widenings of the first oil grooves are disposed at different radial heights.

10 Claims, 2 Drawing Sheets

(56) References Cited

U.S. PATENT DOCUMENTS

| | | | |
|---|---|---|---|
| 2001/0042668 A1 | 11/2001 | Ono et al. | |
| 2003/0034216 A1 | 2/2003 | Fingerman et al. | |
| 2004/0251109 A1* | 12/2004 | Nels | F16D 13/648 192/107 R |
| 2005/0284721 A1* | 12/2005 | Arcot | F16D 13/648 192/70.12 |
| 2007/0000747 A1* | 1/2007 | Miyazaki | F16D 13/648 192/70.12 |
| 2007/0017773 A1* | 1/2007 | Suzuki | F16D 13/648 192/113.36 |
| 2008/0302625 A1* | 12/2008 | Takayanagi | F16D 13/64 192/107 R |
| 2008/0308378 A1* | 12/2008 | Abe | F16D 13/648 192/70.12 |
| 2013/0032271 A1* | 2/2013 | Reiners | F16D 13/64 156/60 |
| 2015/0152923 A1* | 6/2015 | Youngwerth | F16D 13/648 192/107 R |
| 2015/0354649 A1* | 12/2015 | Forssberg | F16D 65/847 188/218 XL |

FOREIGN PATENT DOCUMENTS

| | | |
|---|---|---|
| DE | 44 43 096 C1 | 5/1996 |
| DE | 10 2006 057 112 A1 | 6/2008 |
| DE | 10 2007 047 538 A1 | 12/2008 |
| EP | 1 783 390 A2 | 5/2007 |
| GB | 2 285 851 A | 7/1995 |

* cited by examiner

FRICTION PLATE

CROSS REFERENCE TO RELATED APPLICATIONS

Applicant claims priority under 35 U.S.C. § 119 of Austrian Application No. GM 50058/2016 filed on Apr. 8, 2016, the disclosure of which is incorporated by reference.

BACKGROUND OF THE INVENTION

1. Field of the Invention

The invention relates to a friction plate for wet-running applications comprising an annular main body having a first and a second surface in the axial direction, and on which a friction lining having first oil grooves and second oil grooves is disposed on at least one of the first and the second surfaces, and the first oil grooves extend from a radially inner end face of the friction lining in the direction towards a radially outer end face of the friction lining and terminate at a distance short of the radially outer end face, and the second oil grooves are disposed adjoining the first oil grooves in the radial direction and have a smaller maximum width in the circumferential direction than the first oil grooves, and the first oil grooves have a cross-sectional widening in the region of a radially outer end.

The invention further relates to a wet-running clutch comprising a number of inner plates and a number of outer plates, and the inner plates and outer plates are disposed in an alternating arrangement in the axial direction.

2. Description of the Related Art

In wet-running multi-plate clutches, a fluid, usually lubricating oil, is used as a means of improving dissipation of the heat generated by friction. The intention is to prevent overheating of the friction linings and premature destruction caused as a result. For this reason, a number of different designs of grooved friction linings have already been described in the prior art. Amongst other things, the grooves are provided with a view to improving distribution of the fluid across the friction surface.

However, wet-running friction systems also have a problem inherent in the system. Depending on the viscosity of the lubricant, a greater or lesser drag torque will occur because the friction surfaces sit in contact to a greater or lesser degree with the surface of the respective co-operating plates via the lubricant. This in turn leads to a loss of performance of these friction systems. To counteract this, EP 1 783 390 A2, for example, proposed a solution whereby grooves opening radially outwards are provided in an alternating arrangement with grooves opening radially inwards in the friction linings.

SUMMARY OF THE INVENTION

The underlying objective of this invention is to propose a friction plate which has an improved performance capacity during operation in a wet-running clutch.

The objective is achieved by the invention due to the fact that in the friction plate outlined above, the cross-sectional widenings of the first oil grooves are disposed at a different radial height.

The objective of the invention is also achieved by means of the wet-running clutch outlined above, in which the inner plates are based on the design proposed by the invention.

The advantage of this is that lubrication of the friction linings by means of the first groove enables a rapid dissipation of the heat caused by friction in a manner known per se. The additionally provided thinner second grooves, on the other hand, enable the drag torque to be significantly reduced, as a result of which the performance of the wet-running clutch can be improved. Furthermore, these thinner second grooves enable any foreign particles in the lubricating oil to be held back, at least to a certain extent, thereby enabling a flow of cleaner lubricating oil through these grooves. This improves lubrication of the friction linings. Lubrication can be further improved by disposing the first oil grooves at different radial heights. This more effectively prevents overheating of the friction lining. Due to the second oil grooves, a back-up of oil in the first grooves can also be prevented.

To further improve lubrication and cooling of the friction plate, the cross-sectional widenings of two first oil grooves disposed respectively adjacent to one another in the circumferential direction are disposed at a different radial height and/or n first oil grooves are distributed around the circumference, and the cross-sectional widening of every x-th first oil groove is disposed at a radial height that is shorter than a half radial height of the friction lining, and the rest of the first oil grooves are disposed at a radial height that is greater than a half radial height of the friction lining, where x is a whole number between 2 and (n−1) and n is a whole number and is greater than 2.

A further improvement to the aforementioned effect can be achieved if the second oil grooves have a maximum width in the circumferential direction of the main body that is between 1% and 20% of a maximum width of the first oil groove in the same direction.

To hold the oil in the region of the friction surfaces longer, the second oil grooves may extend at an angle to the radial direction at least in the region of the radially outer end face of the friction lining.

Furthermore, a transition from the first oil grooves to the second oil grooves may be at least partially chamfered. The transfer of the lubricating oil from the first to the third oil groove can be improved as a result, thereby enabling the lubricant to be fed away more effectively.

To improve the inflow of oil into the first oil grooves, the first oil grooves may be provided with a cross-section which becomes wider in the direction towards the radially outer end face of the friction lining.

Based on a preferred embodiment, the first oil grooves may be of an at least approximately droplet shape, thereby enabling the buffering effect of the first oil grooves to be improved.

Furthermore, other oil grooves may be provided which optionally have a first part-region and a second part-region, and the second part-regions have a slimmer width in the circumferential direction than the first part-regions. This enables a decentralized intake of lubricant, thereby enabling cooling of the friction plate to be improved.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
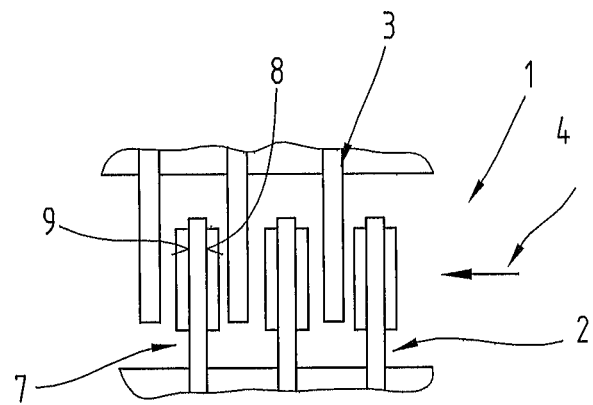
FIG. 1 is a side view illustrating a detail of a multi-plate clutch.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 illustrates a detail of a wet-running multi-plate clutch 1. The multi-plate clutch 1 has a number of inner plates 2 and a number of outer plates 3. The inner plates 2 are disposed in an alternating arrangement with the outer plates 3 in an axial direction 4. The inner plates 2 can be moved in the axial direction 4 relative to the outer plates 3 by an appropriate actuating mechanism so that a frictional contact is established between the inner plates 2 and outer plates 3.

This basic structure of a wet-running multi-plate clutch 1 is known from the prior art. For further details, reference may therefore be made to the relevant prior art.

Figure 2:
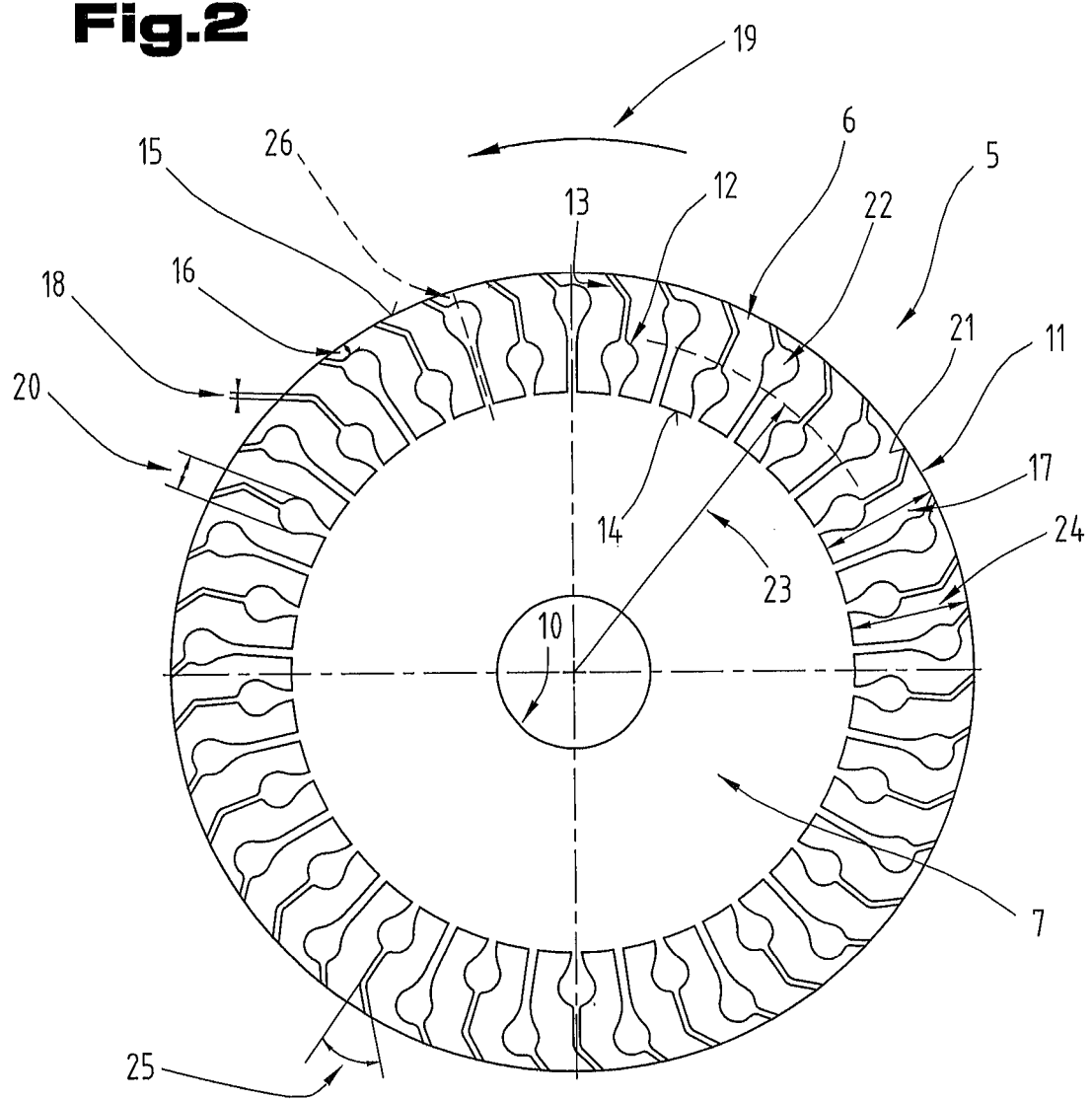
FIG. 2 is a plan view of a friction plate.

FIG. 2 illustrates a friction plate 5 for wet-running applications having a friction lining 6 based on a preferred embodiment.

The friction plates 5 preferably constitute the inner plates 2 in the multi-plate clutch 1 described above. However, it would also be possible to use the friction plates 5 for the outer plates 3 in the multi-plate clutch 1.

The friction plate 5 comprises or consists of an at least approximately annular main body 7 on which the friction lining 6 is disposed.

The main body 7 has a first surface 8 and a second surface 9 lying opposite it in the axial direction 4, as may be seen from FIG. 1. Toothing is provided on a radially inner circumference 10 of the main body 7 by means of which the rotating connection of the friction plate 5 is established in the multi-plate clutch 1 in a manner known per se. However, the toothing should not be construed as restrictive because other types of connection enabling rotation with a shaft may also be used. Generally speaking, driver elements may be provided on the inner circumference.

The friction lining 6, which is of an annular shape in particular, is disposed along a radially outer circumference 11. The friction lining 6 may be disposed directly adjoining the radially outer circumference 11, as may be seen in FIG. 2, or spaced apart from it, i.e. offset radially inwards. As may be seen from FIG. 2, the friction lining 6 is disposed around the entire circumference.

The friction lining 6 is disposed on at least one of the first and second surfaces 8, 9 of the main body 7. However, it is preferable if both surfaces 7, 8 of the main body 7 are lined with friction linings 6, as illustrated in FIG. 1. The friction linings 6 are preferably disposed in mirror image with one another.

The friction lining 6 is usually joined to the main body 7 by gluing, in particular by means of a resin.

The main body 7 is made from a metal material in particular, preferably from a steel.

The friction lining 6 is made from a fiber-reinforced resin in particular, for example from a resin-impregnated paper. Such friction linings are known from the prior art, to which reference may be made in this connection.

All of the inner plates 2 and/or outer plates 3 provided in the multi-plate clutch 1 in the form of friction plates 5 are preferably of an identical design. However, it would also be possible for the friction linings 6 on one of the surfaces 8, 9 or on the first surface 8 to be of a different design from the friction linings 6 of the second surface 9. This relates in particular to the exact design of the grooves of the friction linings 6 explained in more detail below.

The friction lining 6 has a number of first oil grooves 12 and a number of second oil grooves 13 for a fluid, in particular a lubricant, preferably lubricating oil. In particular, the friction lining 6 has no other oil grooves apart from the first and second oil grooves 12, 13.

The first oil grooves 12 differ significantly from the second oil grooves 13. Accordingly, the first oil grooves 12 extend starting from a radially inner end face 14 in the direction towards a radially outer end face 15 of the friction lining 6 but terminate at a distance 16 short of this radially outer end face 15. In other words, the first oil grooves 12 do not extend across an entire width 17 of the friction lining 6 in the radial direction.

The distance 16 may be selected from a range of 1% to 70%, in particular from a range of 5% to 60%, of the width 17 of the friction lining 6 in the radial direction.

The second oil grooves 12 are disposed respectively adjoining the radially outer ends of the first oil grooves 12 and extend into the radially outer end face 15 of the friction lining. The second oil grooves 13 therefore establish the flow connection of the first oil grooves 12 into the second, radially outer end face 15 of the friction lining 6. The second oil grooves 12 do not therefore extend into the first, radially inner end face 14 of the friction lining 6.

The second oil grooves 13 have a smaller maximum width 18 in a circumferential direction 19 of the friction lining 6 than the first oil grooves 12. In particular, the second oil grooves 13 have a maximum width 18 in the circumferential direction 19 of the friction lining 6 of between 1% and 20%, in particular between 1% and 10%, preferably between 1% and 5%, of a maximum width 20 of the first oil groove 12 in the same direction. The second oil grooves 13 are therefore preferably significantly narrower than the first oil grooves 12.

By maximum width 18 respectively 20 is meant the width in the respective oil groove 12 respectively 13 that is the largest in the circumferential direction 19. It is also possible for the widths 18, 20 to vary along their profile, based on different cross-sectional shapes of the oil grooves 12, 13.

The transition from the radially inner end face 14 to the first oil groove 12 may be of a sharp-edged design or may be rounded with a view to improving the inflow behavior of the lubricant into the first oil groove 12, in particular to prevent turbulence.

The transitions from the first oil grooves 12 to the second oil grooves 13 may likewise be of a sharp-edged design or rounded or at least partially chamfered.

The second oil grooves 13 may have an at least approximately rectangular or square cross-section as viewed in the direction towards the end face 15. However, it would also be possible for the second oil grooves 13 to have a different cross-sectional shape, for example a triangular cross-section as viewed in the direction towards the end face 15. Based on this embodiment of the cross-sectional shape, the maximum width 18 of the second oil grooves 13 means the width 18 at an outer surface 21 of the friction lining 6. The outer surface 21 is the surface 21 which can be engaged in frictional contact with the respective co-operating plate, in other words the respective outer plate 3 of the multi-plate clutch 1 (FIG. 1) in particular.

The angle subtended by the groove side faces of the second oil grooves 13 based on the triangular cross-section may be selected from a range of 50° to 110°, in particular from a range of 70° to 90°. For example, this angle may be 80°.

However, it would also be possible to opt for other cross-sectional shapes for the second oil grooves 13, for example a trapezoidal shape (in particular with the largest dimension at the surface 21 of the friction lining 6), semi-circular, etc.

The second oil grooves 16 may have a depth in the axial direction 4 (FIG. 1) of the friction plate 5 selected from a range of 5% to 55%, in particular 10% to 50%, preferably 20% to 40%, of a total thickness of the friction lining 6 in the same direction. However, the second oil grooves 16 may also extend continuously end-to-end in the axial direction 4 of the friction lining, in which case the depth of the second oil grooves 13 may also be 100% of the total thickness of the friction lining 6 in the axial direction 4.

Based on the preferred embodiment of the friction plate 5, the first oil grooves 12 extend continuously end-to-end through the friction lining 6 in the axial direction 4 of the friction plate 5 (FIG. 1). This being the case, the first surface 8 respectively the second surface 9 of the main body 7 of the friction plate 5 constitutes the groove base of the first oil grooves 12 (FIG. 1). Based on this embodiment, therefore, the first oil grooves 12 have a depth which corresponds to the total thickness of the friction lining 6.

However, it would also be possible for the first oil grooves 12 to have a smaller depth than this. This being the case, the depth of the first oil grooves 12 may be selected from a range of 40% to 95%, in particular 50% to 95%, preferably 60% to 95%, of the total thickness of the friction lining 6.

If the first and second oil grooves 12, 13 extend continuously end-to-end through the friction lining 6, the friction lining 6 can also be described as being made up of friction lining segments.

With embodiments of the friction plate 5 where the first and/or second oil grooves 12, 13 extend continuously end-to-end through the friction lining 6 as far as the main body 7 of the friction plate, improved cooling of the main body 7 of the friction plate 5 can be achieved.

Based on another embodiment of the friction lining 6, at least parts of the first oil grooves 12 may be provided with a cross-section that becomes wider in the direction towards the radially outer end face 15 of the friction lining 6.

The first oil grooves 12 have at least one cross-sectional widening 22. As illustrated in FIG. 2, the first oil grooves 12, based on a preferred embodiment, may have a cross-section that is approximately droplet shaped as seen in plan view, and the ends of the first oil grooves 12 lying closer to the radially outer end face 15 are preferably rounded.

However, it would also be possible to opt for other shapes of the cross-sectional widening 22 of the first oil groove 12, again as seen in plan view, for example a rectangular shape, trapezoidal shape, an at least approximately circular shape, etc.

If the first oil grooves 12 do not extend through the total thickness of the friction lining 6, the first oil grooves 12 may also have a varying cross-section in this direction, i.e. in the direction of the depth of the first oil grooves 12 and again, the maximum width 20 of the first oil grooves 12 is disposed at the outer surface 21 of the friction lining 6.

As may be seen from FIG. 2, the cross-sectional widenings 22 of the first oil grooves 12 are disposed at different radial heights of the friction lining 6.

Based on the preferred embodiment, the cross-sectional widenings 22 of two first oil grooves respectively disposed adjacent to one another in the circumferential direction 19 are disposed at a different radial height so that every second cross-sectional widening 22 is disposed at a lower radial height. In particular, every second cross-sectional widening 22 is disposed at a radial height that is shorter than a half radial height 23 of the friction lining 6. The other cross-sectional widenings 22, on the other hand, are disposed at a radial height that is greater than the half radial height 23 of the friction lining 6. The half radial height 23 of the friction lining 6 extends through the center of a total width 24 of the friction lining 6 in the radial direction. The cross-sectional widenings 22 therefore lie respectively entirely below or entirely above this half radial height 23 of the friction lining, as may be seen from FIG. 2. Furthermore, the cross-sectional widenings 22 of the first oil grooves 12 do not directly adjoin the first, radial inner end face 14 of the friction lining 6 but are provided or disposed at a distance short of it.

Generally speaking, n first oil grooves 12 may be distributed around the circumference of the friction lining 6 and the cross-sectional widening 22 of every x-th first oil groove 12 is disposed at a radial height that is shorter than the half radial height 23 of the friction lining 6 and the rest of the first oil grooves 12 are disposed at a radial height that is greater than the half radial height of the friction lining 6, where x is a whole number between 2 and (n−1) and where n is a whole number and is greater than 2.

The first oil grooves 12 are preferably disposed so that they extend in the radial direction of the friction plate 5.

Based on the preferred embodiment of the friction plate 5, on the other hand, the second oil grooves 13 have a profile that is angled with respect to the radial direction at least in the region of the radially outer end face 15 of the friction lining 6 so that they open in particular into the second radially outer end face 15 of the friction lining 6 at an acute angle 25 with respect to the radial direction. The angle 25 may be selected from a range of 2° to 70°, in particular from a range of 10° to 45°.

Since some of the first oil grooves 12 extend to a radial height that is greater than the half radial height 23 of the friction lining 6, the second oil grooves 13 directly adjoining these first oil grooves 12 may extend in a straight line, i.e. are not angled, as may be seen from FIG. 2. The second oil grooves 13 directly adjoining those first oil grooves 12 which extend to a radial height that is shorter than the half radial height 23 of the friction lining 6 may have an angled profile, as may also be seen from FIG. 2. Accordingly, the part-region directly adjoining the first oil grooves 12 may extend in the radial direction and the other part-region of the second oil grooves 13 adjoining this first part-region may extend at the angle 25 specified above. The split of the total length of the second oil grooves 12 into the first and the other part-region may be selected from a range of 2:1 to 1:2.

Furthermore, those second oil grooves 13 with a longitudinal profile that is not angled adjoin the first oil grooves 12 laterally offset from a longitudinal mid-axis 26 of the latter, as may be seen from FIG. 2. The first part-regions of the rest of the second oil grooves 13, on the other hand, may be disposed so that they extend along this longitudinal mid-axis 26 through the first oil grooves 12.

Figure 3:
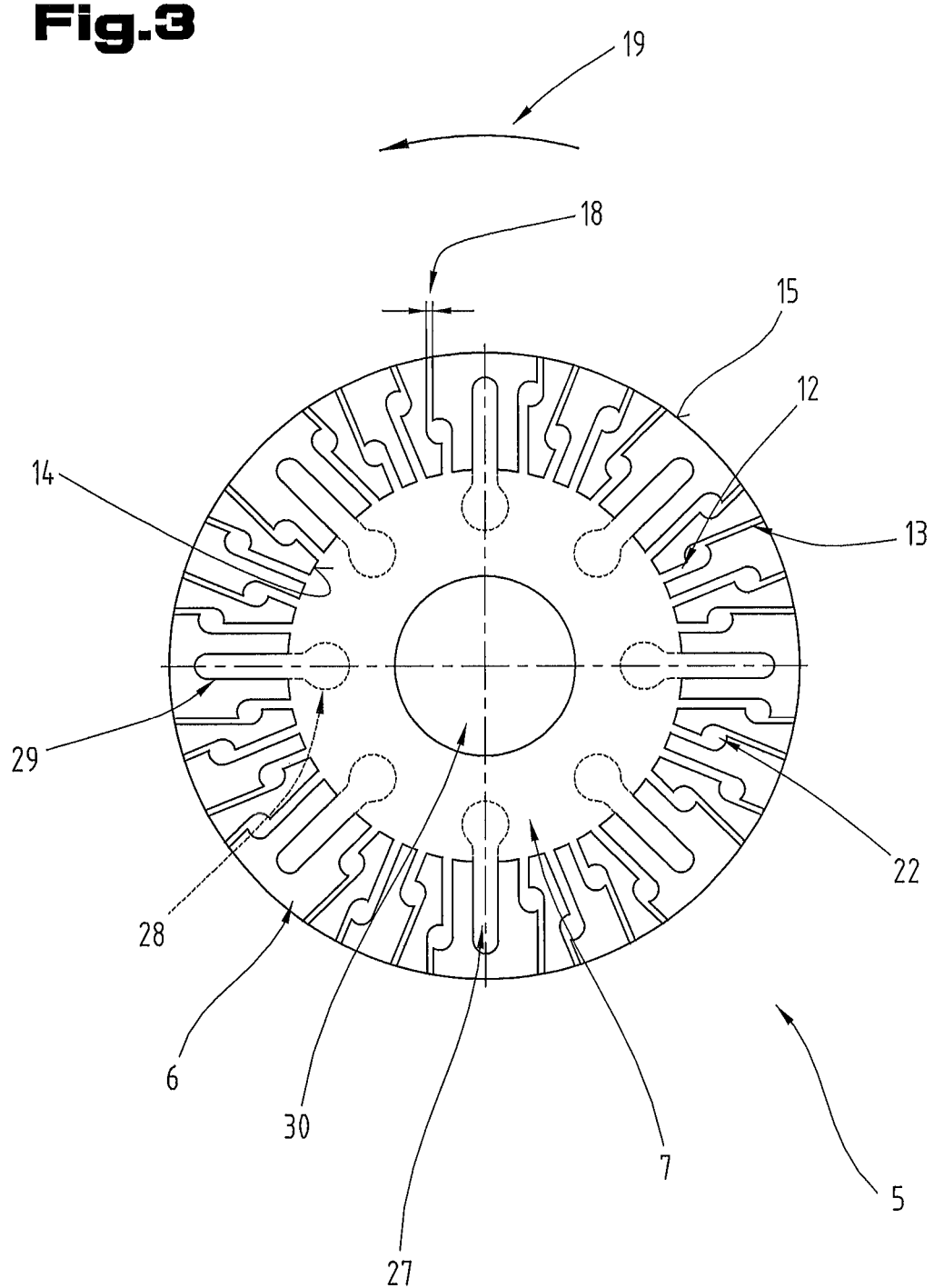
FIG. 3 is a plan view of an embodiment of a friction plate.

FIG. 3 illustrates another embodiment of the friction plate 5 which may optionally be construed as an independent embodiment in its own right, the same reference numbers and component names being used to denote parts that are the same as those used with reference to FIGS. 1 and 2 above. To avoid unnecessary repetition, reference may be made to the more detailed description of FIGS. 1 and 2 above.

The friction plate 5 has the annular main body 7 with the first and second surfaces 8, 9 (FIG. 1). A friction lining 6 is disposed at least on one of the first and second surfaces 8, 9. The first oil grooves 12 and the second oil grooves 13 adjoining them are in turn provided in the friction lining 6, as explained above with reference to the embodiment of the friction plate 5 illustrated in FIG. 2. The first oil grooves 12 extend from the radially inner end face 14 of the friction lining 6 in the direction towards the radially outer end face 15 of the friction lining 6 and terminate at a distance short of the radially outer end face 15. The second oil grooves 13 may have a smaller maximum width 18 in the circumferential direction 19 than the first oil grooves 12. The first oil grooves 12 are provided with the cross-sectional widenings 22 in the region of a radially outer end and these cross-sectional widenings 22 of the first oil grooves 12 are disposed at different radial heights.

The first oil grooves 12—with the exception of the cross-sectional widenings 22—and the second oil grooves 13 extend in a straight line. The cross-sectional widenings 22 in this instance are preferably disposed so that the remaining part of the first oil grooves 12 opens into the cross-sectional widenings 22 at a tangent and the second oil grooves 13 extend out of the cross-sectional widenings 22 at a tangent, and the first and second oil grooves 12, 13 are disposed so that they extend at least approximately radially. By at least approximately is meant that the profile of the first and/or the second oil grooves 12, 13 may subtend and angle within a range of 1° to 20° with the radial direction.

This tangential inflow and outflow of the lubricant to and from the cross-sectional widenings 22 illustrated in FIG. 3 creates turbulence of the lubricant there, as a result of which the lubricant remains longer in the first and second oil grooves 12, 13, in particular in the cross-sectional widenings 22, thereby enabling cooling to be improved.

The cross-sectional widenings 22 preferably have a circular cross-section (as seen in plan view).

At least some of the second oil grooves 13, in particular all of them, may have a geometry which tapers radially outwards—as seen in plan view. Likewise, at least some of the first oil grooves 12, in particular all of them, have a geometry which tapers radially outwards, at least across a part-region of the profile. Accordingly—apart from the cross-sectional widenings 22—lubricant passages formed by the first and second oil grooves 12, 13 taper from the radially inner end face 14 in the direction towards the radially outer end face 15 of the friction lining 6.

It is also possible for other oil grooves 27 geometrically different from the first and second oil grooves 12, 13 to be provided or disposed in the friction lining 6 distributed around the circumference of the friction plate 5, in particular uniformly. These other oil grooves 27 preferably have a larger width in the circumferential direction 19 than the first and second oil grooves 12, 13. The other oil grooves 27 extend from/starting in the radially inner end face 14 of the friction lining 6 and terminate at a distance short of the radially outer end face 15 of the friction plate 5. It is also preferable if the other oil grooves 27 have a rounded, in particular semicircular, groove base.

As indicated by broken lines in FIG. 2, these other oil grooves 27 may also be at least approximately of a droplet shape (as seen in plan view) and have a first part-region 28 and a second part-region 29. The first part-region 28 may be disposed outside of the friction lining 6 (radially underneath the friction lining 6) in the main body 7 of the friction plate 5. Furthermore, the second part-regions 29 preferably have a smaller width in the circumferential direction 19 than the first part-regions 28. The radially outer ends and the radially inner ends of the other oil grooves 27 are preferably of a rounded design, in particular semicircular (as seen in plan view). The other oil grooves 27 terminate at a distance short of the radially outer end face 15 of the friction plate 5. Likewise, the first part-regions 28 are disposed at a distance from the concentrically disposed mount 30 for a shaft.

The other oil grooves 27 enable a decentralized intake (and optionally discharge, at least to a certain extent) of the lubricant.

The examples of embodiments described and illustrated represent possible embodiments of the friction plate 5, and it should be pointed out at this stage that different combinations of the individual embodiments with one another are also possible.

For the sake of good order, finally, it should be noted that in order to provide a clearer understanding of the structure of the multi-plate clutch 1 and friction plate 5, the latter are illustrated to a certain extent out of scale and/or on an enlarged scale and/or on a smaller scale.

Although only a few embodiments of the present invention have been shown and described, it is to be understood that many changes and modifications may be made thereunto without departing from the spirit and scope of the invention.

What is claimed is:

1. A friction plate for wet-running applications, comprising an annular main body having a first and a second surface in an axial direction, and a friction lining having at least two first oil grooves and at least two second oil grooves is disposed on at least one of the first and second surfaces, and the at least two first oil grooves extend from a radially inner end face of the friction lining in a direction towards a radially outer end face of the friction lining and terminate at a distance from the radially outer end face, and the at least two second oil grooves are disposed directly adjoining the at least two first oil grooves in a radial direction and have a smaller maximum width in a circumferential direction than the at least two first oil grooves, and the at least two first oil grooves are each provided with a cross-sectional widening in a region of a radially outer end, wherein the cross-sectional widenings of the at least two first oil grooves are disposed at different radial heights.

2. The friction plate according to claim 1, wherein the cross-sectional widenings of two of the at least two first oil grooves disposed respectively adjacent to one another in the circumferential direction are disposed at the different radial heights.

3. The friction plate according to claim 1, wherein n first oil grooves are provided, wherein the n first oil grooves are distributed around the circumference of the friction lining, and the cross-sectional widening of every x-th first oil groove is disposed at a radial height that is shorter than a half radial height of the friction lining and the rest of the first oil grooves are disposed at a radial height that is greater than the half radial height of the friction lining, where x is a whole number between 2 and (n−1) and where n is a whole number and is greater than 2.

4. The friction plate according to claim 1; wherein the at least two second oil grooves have a maximum width in the circumferential direction of the main body of between 1% and 20% of a maximum width of the at least two first oil grooves in the same direction.

5. The friction plate according to claim 1, wherein the at least two second oil grooves have a profile extending at an angle with respect to the radial direction at least in the region of the radially outer end face of the friction lining.

6. The friction plate according to claim 1, wherein a transition from the at least two first oil grooves to the at least two second oil grooves is at least partially chamfered.

7. The friction plate according to claim 1, wherein the at least two first oil grooves are provided with a cross-section which becomes wider in the direction towards the radially outer end face of the friction lining.

8. The friction plate according to claim 1, wherein the cross-sectional widenings are of an at least approximately droplet shape.

9. The friction plate according to claim 1, further comprising at least two third oil grooves disposed in the friction lining and distributed around the circumference of the friction plate, wherein each of the at least two third oil grooves is geometrically different from the first and second oil grooves and have a first part-region and a second part-region, and wherein the second part-region has a smaller width in the circumferential direction than the first part-region.

10. A wet-running multi-plate clutch comprising a number of inner plates and a number of outer plates, the inner plates and the outer plates being disposed in an alternating arrangement in the axial direction, wherein the inner plates are friction plates comprising an annular main body having a first and a second surface in an axial direction, and a friction lining having at least two first oil grooves and at least two second oil grooves is disposed on at least one of the first and second surfaces, and the at least two first oil grooves extend from a radially inner end face of the friction lining in a direction towards a radially outer end face of the friction lining and terminate at a distance from the radially outer end face, and the at least two second oil grooves are disposed directly adjoining the at least two first oil grooves in a radial direction and have a smaller maximum width in a circumferential direction than the at least two first oil grooves, and the at least two first oil grooves are each provided with a cross-sectional widening in a region of a radially outer end, wherein the cross-sectional widenings of the at least two first oil grooves are disposed at different radial heights.

\* \* \* \* \*